US012688524B2

(12) United States Patent
Chambers et al.

(10) Patent No.: US 12,688,524 B2
(45) Date of Patent: Jul. 21, 2026

(54) INTELLIGENT RECOMMENDATIONS BASED ON MULTIMODAL INPUTS

(71) Applicant: Expedia, Inc., Seattle, WA (US)

(72) Inventors: Landon Chambers, Austin, TX (US);
Travers Humble, Austin, TX (US);
Anush Kumar, Bellevue, WA (US);
Nehemias Luna, Seattle, WA (US);
Raisa Meneses Guzman, Seattle, WA
(US); Marc Silbey, Mercer Island, WA
(US); Justin Simonelli, Seattle, WA
(US); Phalguna Yadlapati, Toronto
(CA)

(73) Assignee: Expedia, Inc., Seattle, WA (US)

( * ) Notice: Subject to any disclaimer, the term of this
patent is extended or adjusted under 35
U.S.C. 154(b) by 222 days.

(21) Appl. No.: 18/542,097

(22) Filed: Dec. 15, 2023

(65) Prior Publication Data

US 2024/0428316 A1 Dec. 26, 2024

Related U.S. Application Data

(60) Provisional application No. 63/522,345, filed on Jun.
21, 2023.

(51) Int. Cl.
*G06Q 30/00* (2023.01)
*G06N 20/00* (2019.01)
*G06Q 30/0601* (2023.01)

(52) U.S. Cl.
CPC ......... *G06Q 30/0631* (2013.01); *G06N 20/00*
(2019.01)

(58) Field of Classification Search
CPC .................................................. G06Q 30/0631
See application file for complete search history.

(56) References Cited

U.S. PATENT DOCUMENTS 9,256,637 B2 2/2016 Rose
9,552,427 B2 1/2017 Rose
(Continued)

FOREIGN PATENT DOCUMENTS

CN 112256967 A 1/2021
JP 2020-071564 5/2020
WO WO-2022/005841 1/2022

OTHER PUBLICATIONS

Cheng, An-Jung, et al. "Personalized travel recommendation by
mining people attributes from community-contributed photos." Pro-
ceedings of the 19th ACM international conference on Multimedia.
2011.*

(Continued)

*Primary Examiner* — Kathleen Palavecino
(74) *Attorney, Agent, or Firm* — Foley & Lardner LLP

(57) ABSTRACT

A computing system includes a memory device and a
processor structured to: receive, from a user device, a media
input; extract, using a machine-learning model, at least one
feature of the media input; identify, using the machine-
learning model, at least one intent; determine, using the
machine-learning model, at least one action policy; generate
a user interface comprising the media input, the at least one
extracted feature of the media input, and the at least one
action policy; provide the user interface to the user device;
receive, via an input to the user interface, an indication of a
selection of the at least one action policy displayed on the
user interface; generate a second user interface comprising
a plurality of options associated with the selected at least one
action policy; and provide the second user interface to the
user device.

20 Claims, 12 Drawing Sheets

100

(56)     References Cited

U.S. PATENT DOCUMENTS

| | | | |
|---|---|---|---|
| 9,618,343 B2 | 4/2017 | Kahn et al. | |
| 9,830,561 B2 | 11/2017 | Renaudie et al. | |
| 10,783,460 B1 | 9/2020 | Davis et al. | |
| 10,866,985 B2 * | 12/2020 | Chandra Sekar Rao | ................... G06Q 30/0627 |
| 2011/0131241 A1 | 6/2011 | Petrou et al. | |
| 2016/0238400 A1 * | 8/2016 | Bank ................. | G01C 21/3484 |
| 2017/0098159 A1 | 4/2017 | Sharifi et al. | |
| 2019/0042976 A1 * | 2/2019 | Tanglertsampan ..... | G06N 20/00 |
| 2020/0019419 A1 | 1/2020 | Yada et al. | |
| 2021/0012407 A1 * | 1/2021 | Kumar ................... | G06N 20/00 |
| 2021/0273892 A1 * | 9/2021 | Rakshit ................ | G06F 16/953 |
| 2022/0012072 A1 * | 1/2022 | Barnett .............. | G06F 16/9577 |
| 2023/0131392 A1 * | 4/2023 | Kim ..................... | G06F 16/583 701/533 |

OTHER PUBLICATIONS

EPO Extended Search Report for Application No. 23219370.6 mailing date May 23, 2024, 7 pages.

* cited by examiner

100

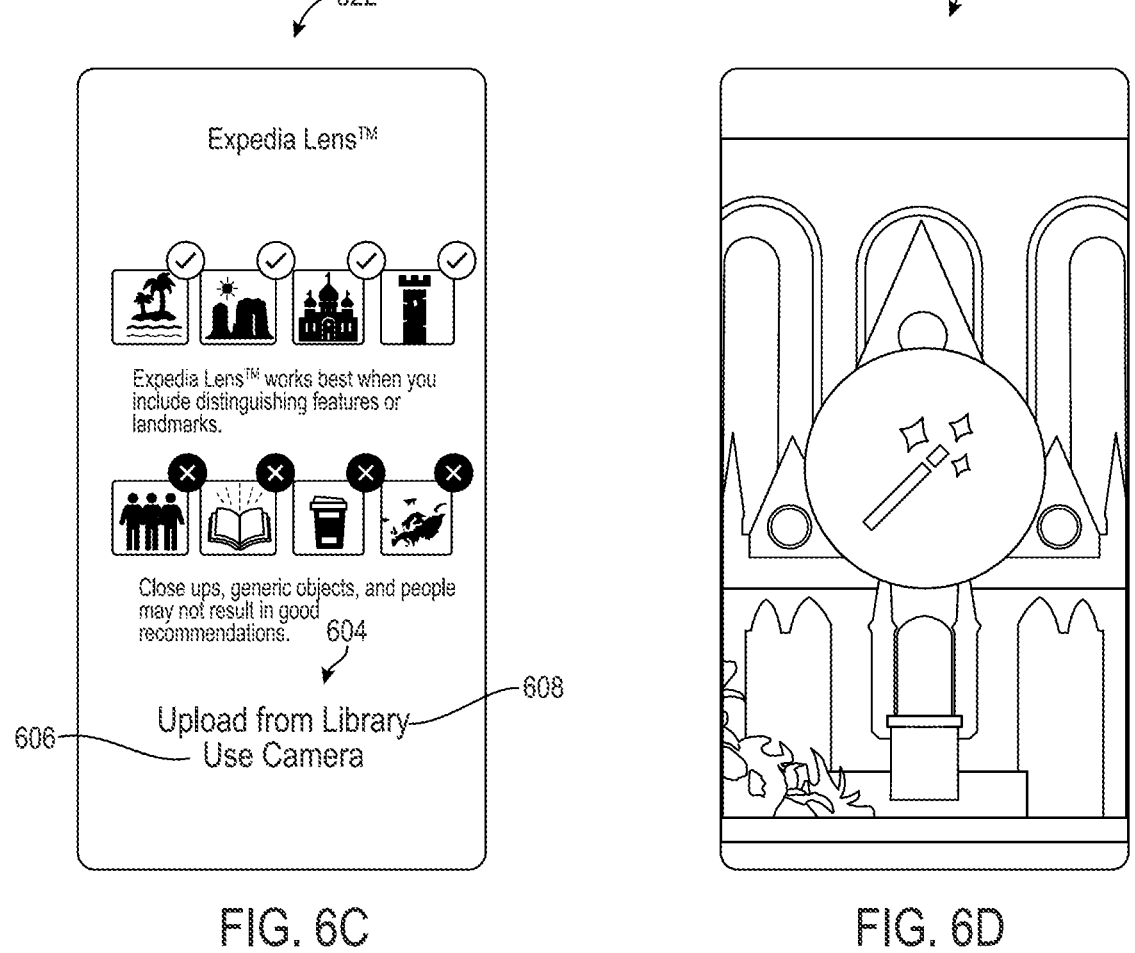
FIG. 6C                    FIG. 6D

800

| DESCRIPTION OF EXAMPLE MEDIA | UNDERSTOOD INTENT | RECOMMENDED ACTION(S) |
|---|---|---|
| BUG IN A BATHROOM SINK | ISSUE WITH HOTEL ROOM | • PROVIDE HOTEL'S FRONT DESK PHONE NUMBER<br>• CONNECT TO AGENT TO FIND NEW ACCOMMODATIONS |
| FLAT TIRE ON A CAR | INOPERABLE VEHICLE | • REVIEW INSURANCE POLICY<br>• BOOK IN RENTAL CAR |
| LINE OF PEOPLE FOR AN AIRLINE SERVICE DESK | FLIGHT CANCELLATION | • FIND A NEW FLIGHT TO DESTINATION AIRPORT |

| DESCRIPTION OF EXAMPLE IMAGE | UNDERSTOOD INTENT | RECOMMENDED ACTION(S) |
|---|---|---|
| CONVERTIBLE SPORTS CAR | EXPLICIT: RENTAL CAR BOOKING<br>THEMATIC: SPORTS CAR ACTIVITIES | • EXPLICIT: CAR RENTALS WITH INVENTORY OF EXOTIC AUTOMOBILES<br>• THEMATIC: CAR-CENTERED EVENTS OR POINTS OF INTEREST (e.g., AUTOMOBILE MUSEUM, UPCOMING F1 RACE) |
| CLIMBING SHOES | EXPLICIT: ROCK CLIMBING INTEREST<br>THEMATIC: OUTDOOR ROCK-CLIMBING SITES | • EXPLICIT: GUIDED ROCK-CLIMBING TOURS<br>• THEMATIC: INFORMATION ON A SELECTION OF ROCK-CLIMBING SITES, LEADS USER DOWN A TRIP PLANNING FUNNEL. |
| LINE OF PEOPLE FOR AN AIRLINE DESK | FLIGHT CANCELLATION | • BOOK NEW FLIGHT TO DESTINATION AIRPORT |

| DESCRIPTION OF EXAMPLE IMAGE | UNDERSTOOD INTENT | RECOMMENDED ACTION(S) |
|---|---|---|
| PAIR OF SKIS | ACTIVITY - RESORT SKIING | • SKI LESSONS PROVIDED BY THE SKI RESORT CLOSEST TO THE TRAVELER'S HOTEL |
| BAG OF GOLF CLUBS | ACTIVITY - GOLF COURSE | • OFFER OPPORTUNITY TO DEMO CLUBS FROM THE LOCAL PRO SHOP |
| POOL IN THE BACKYARD OF A VACATION RENTAL | ACTIVITY - SWIMMING POOL | • RECOMMENDATION OF POOL TOYS APPROPRIATE FOR CHILDREN |

FIG. 8

INTELLIGENT RECOMMENDATIONS BASED ON MULTIMODAL INPUTS

CROSS REFERENCE TO RELATED APPLICATION

This application claims the benefit of and priority to U.S. Provisional Patent Application No. 63/522,345, filed Jun. 21, 2023, which is incorporated herein by reference in its entirety.

TECHNICAL FIELD

Embodiments of the present disclosure relate generally to systems and methods for generating and providing intelligent recommendations based on analyzing one or more of various media inputs, such as via a machine-learning model.

BACKGROUND

Conventionally, there are often several steps a user must take when searching for a travel destination or planning a trip. For example, a user often must manually search for different destinations, excursions, and travel itineraries separately to search for, plan, and schedule a trip, making it difficult to identify pertinent destinations and other information in a timely and efficient manner. In some instances, a user may desire to travel to a specific type of culture or environment, but may have no means of determining a desired destination including such culture or environment. As a result, increased network occupancy and processing power is required to perform numerous searches to attempt to identify the desired destination. Accordingly, enhanced systems and methods for increasing efficiency of planning and searching for a trip and determining intelligent recommendations regarding the trip are desirable.

SUMMARY

At least one aspect of the present disclosure relates to a computing system. The computing system may include a network interface configured to communicate with a user device; at least one memory device; and a processing circuit comprising at least one processor and at least one memory, the at least one memory structured to store instructions that are executable to cause the at least one processor to: receive, via the network interface, from the user device, a media input; extract, using a machine-learning model, at least one feature of the media input; identify, using the machine-learning model, at least one intent associated with the at least one extracted feature of the media input; determine, using the machine-learning model, at least one action policy based on the at least one identified intent; generate a user interface comprising the media input, the at least one extracted feature of the media input, and the at least one action policy; provide, via the network interface, the user interface to the user device; receive, via the network interface and via an input to the user interface, an indication of a selection of the at least one action policy displayed on the user interface; generate a second user interface comprising a plurality of options associated with the selected at least one action policy; and provide, via the network interface, the second user interface to the user device.

At least one aspect of the present disclosure relates to a computer-implemented method. The computer-implemented method includes: receiving, by a computing system and from a user device communicably coupled to the computing system, a media input; extracting, by the computing system, using a machine-learning model stored in the computing system, at least one feature of the media input; identifying, by the computing system, using the machine-learning model, at least one intent associated with the at least one extracted feature of the media input; determining, by the computing system and using the machine-learning model, at least one action policy based on the at least one identified intent; generating, by the computing system, a user interface comprising the media input, the at least one extracted feature of the media input, and the at least one action policy; providing, by the computing system, the user interface to the user device; receiving, by the computing system via an input to the user interface of the user device, an indication of a selection of the at least one action policy displayed on the user interface; generating, by the computing system, a second user interface comprising a plurality of options associated with the selected at least one action policy; and providing, by the computing system, the second user interface to the user device.

At least one aspect of the present disclosure relates to a non-transitory computer-readable media having computer-executable instructions embodied therein that, when executed by at least one processor of a provider computing system, cause the provider computing system to perform operations. The operations include: receiving, from a user device, a media input; extracting, using a machine-learning model, at least one feature of the media input; identifying, using the machine-learning model, at least one intent associated with the at least one extracted feature of the media input; determining, using the machine-learning model, at least one action policy based on the at least one identified intent; generating a user interface comprising the media input, the at least one extracted feature of the media input, and the at least one action policy; providing the user interface to the user device; receiving, via an input to the user interface of the user device, an indication of a selection of the at least one action policy displayed on the user interface; generating a second user interface comprising a plurality of options associated with the selected at least one action policy; and providing the second user interface to the user device.

At least one aspect of the present disclosure relates to a method. The method may include receiving, by one or more processors, at least one media input. The method may include analyzing, by the one or more processors, the at least one media input using at least one machine-learning model. The method may include generating, by the one or more processors, a recommendation based on the analysis of the at least one media input using the at least one machine-learning model.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects may be combined and it will be readily appreciated that features described in the context of one aspect of the present disclosure may be combined with other aspects. Aspects may be implemented in any convenient form. In a non-limiting example, aspects may be implemented by appropriate computer programs, which may be carried on appropriate carrier media (computer readable media), which may be tangible carrier media (e.g., disks) or intangible carrier media (e.g., communications signals). Aspects may also be implemented using suitable apparatus, which may take the form of programmable computers running computer programs arranged to implement the aspect. As used in the specification and in the claims, the singular form of "a," "an," and "the" include plural references unless the context clearly dictates otherwise.

BRIEF DESCRIPTION OF THE FIGURES

The accompanying drawings are not intended to be drawn to scale. Like reference numbers and designations in the various drawings indicate like elements. For purposes of clarity, not every component may be labeled in every drawing. In the drawings:

FIGS. 6A-6I depict example user interfaces provided to a user to receive at least one intelligent recommendation based on a multi-modal input, in accordance with one or more implementations;

FIG. 8 depicts a table of example use cases of providing at least one intelligent recommendation based on at least one media input, in accordance with one or more implementations.

DETAILED DESCRIPTION

Figure 1:
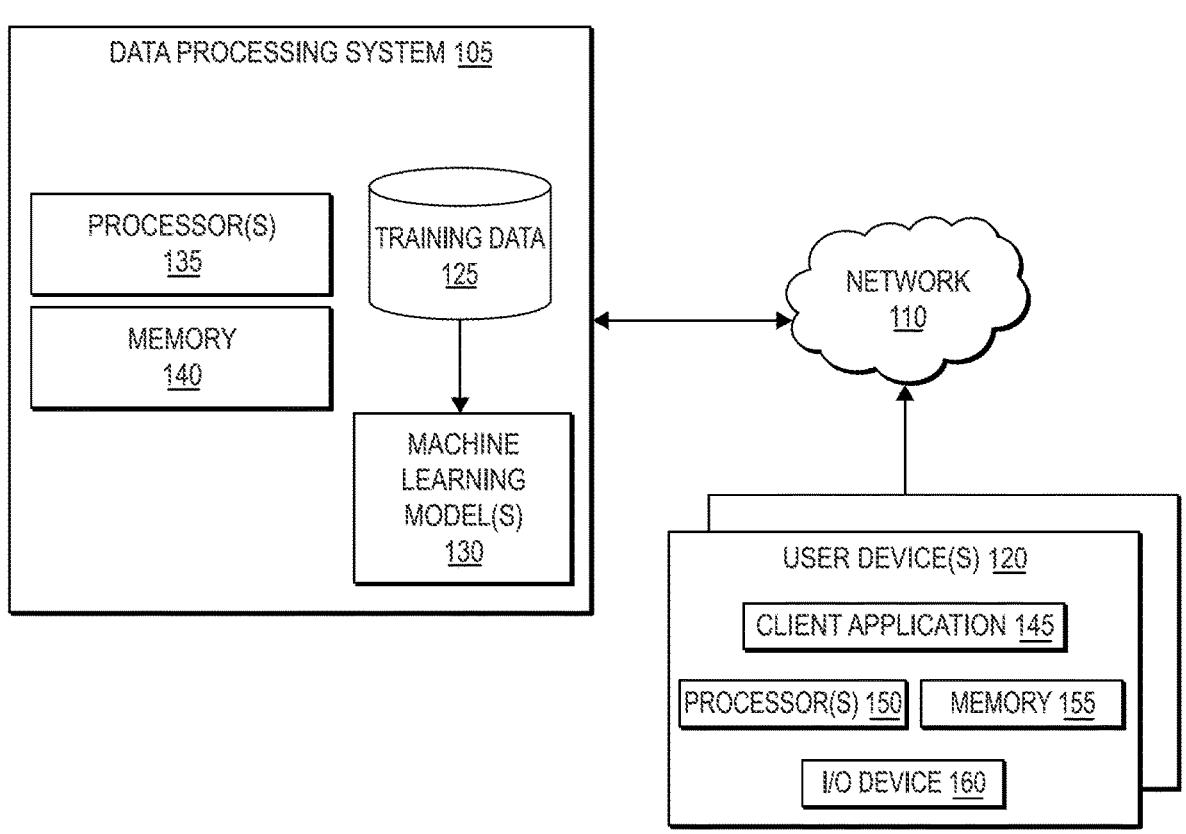
FIG. 1 illustrates an example system for generating and providing at least one intelligent recommendation based on a multi-modal input(s), in accordance with one or more implementations.

Below are detailed descriptions of various concepts related to and implementations of techniques, approaches, methods, apparatuses, and systems for generating and providing intelligent recommendations based on at least one modal input, such as at least one media input and, particularly, one or more multi-modal media inputs (e.g., photos or pictures, etc.). The various concepts introduced above and discussed in detail below may be implemented in any of numerous ways, as the described concepts are not limited to any particular manner of implementation. Examples of specific implementations and applications are provided primarily for illustrative purposes.

Referring generally to the Figures, aspects and embodiments of the present disclosure relate to systems and methods that improves conventional computers and, specifically, electronic networked search processes. The systems and methods improve electronic searches (e.g., searches for content, such as destinations) by generating and providing intelligent travel recommendation(s) using various machine-learning methods. More specifically, the present disclosure relates to systems, apparatuses, and methods for receiving at least one media input of a plurality of media inputs (e.g., an image file), analyzing the at least one media input using at least one machine-learning model, determining an intent (e.g., to visit a destination, the receive more information, to find a retailer, to view upcoming events, etc.) associated with the at least one media input based on the analysis, and generating and providing an intelligent recommendation (e.g., a trip itinerary, a summary of an insurance policy, a retailer location, how to purchase tickets to an upcoming event, etc.) to a user device based on the at least one media input and the determined intent. In some implementations, the systems and methods described herein may generate and provide a plurality of recommendations based on the one or more determined intents. As described herein, the machine-learning model may be trained using one or more training data sets. For example, the machine-learning model may be trained to summarize a media input, classify an intent associated with the media input, and determine an action policy (e.g., recommendation).

Beneficially, by allowing travelers and other users to start a search for a trip using one or more media inputs, the systems, apparatuses, and methods described herein provide an efficient and interactive way to initiate or search for a trip that may decrease network occupancy and reduce a time required to identify and plan (e.g., book) one or more experiences (e.g., a travel experience). Typically, a user must provide a plurality of searches to identify, assess, and book various aspects of a trip, such as airfare, car rentals, lodging, and excursions. The amount of searches multiplies when the user does not have a definitive idea of where the user would like to visit. For example, the user may see a photo of a destination and would like to visit that destination but does not know exactly where that destination is located. In turn, the user spends significant amounts of time performing internet searches trying to locate that destination, which occupies bandwidth and processing power all while occupying the user's time. The systems, apparatuses, and methods described herein provide a technical solution to at least the technical problem of unfocused searches by analyzing at least one media input, identifying a destination or experience associated with the at least one media input, and generating a potential itinerary or plan based on the identification. In this regard, a non-conventional atypical search system, method, and apparatus is provided. In operation, the number of searches may decrease, which may result in drastically improved time savings as well as bandwidth savings. As described herein, the systems and methods described herein may leverage outputs of a machine-learning model to reduce the amount of inputs necessary to schedule travel, thereby reducing an amount of time it takes to plan a trip while increasing processing power of a computing system. Additionally, by associating media inputs of generic subjects to themes and applying themes to trip destinations, the systems and methods described herein may facilitate increasing application repeat rates among users and increase a likelihood of conversion. These and other features and benefits are described more fully herein below.

FIG. 1 illustrates an example system 100 for generating and providing intelligent recommendations based on at least one media input and/or multimedia (e.g., a multimodal) inputs, in accordance with one or more implementations. In some implementations, the system 100 may be configured to generate and provide intelligent recommendations associated with traveling and/or trip planning. Aspects of traveling can include, but are not limited to, transportation booking (e.g., flights, boats, trains, car rentals, cancellation policies, prices, etc.), lodging booking (e.g., hotel rentals, other lodging rentals, cancellation policies for the lodges, prices, etc.), excursions associated with the experience (e.g., sightseeing excursions, activity excursions, etc.), and other components of a traveler experience (e.g., departure/arrival dates, duration of stays in various locations, and so on).

The system 100 includes a data processing system 105 coupled to one or more user devices 120. The data processing system 105 can store training data 125. The data processing system 105 includes one or more machine-learning models 130 that can be trained using the training data 125, as described in greater detail herein. Although shown as internal to the data processing system 105, it should be understood that the training data 125 may be stored external to the data processing system 105, for example, as part of a cloud computing system or an external storage medium in communication with the data processing system 105 via the network 110.

Each component (e.g., the data processing system 105, the network 110, the user devices 120, the machine-learning model 130, etc.) of the system 100 can be implemented using the hardware components or a combination of software with the hardware components of a computing system, such as the computing system 700 detailed in connection with FIG. 7, or any other computing system described herein. Each component of the data processing system 105 can perform one or more of the functionalities detailed herein.

The data processing system 105 can include at least one processing circuit, which may, as an example, include at least one processor 135 and at least one memory 140. The memory 140 can store computer-executable instructions that, when executed by the processor 135, cause the processor 135 to perform one or more of the operations described herein. The processor 135 may include a microprocessor, an application-specific integrated circuit (ASIC), a field-programmable gate array (FPGA), a graphics processing unit (GPU), a tensor processing unit (TPU), etc., and/or combinations thereof. The memory 140 may include, but is not limited to, electronic, optical, magnetic, or any other storage or transmission device capable of providing the processor with program instructions. The memory 140 may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various of the operations or functions described herein. The data processing system 105 can include any or all of the components and perform any or all of the functions of the computing system 700 described herein in conjunction with FIG. 7.

The network 110 can include packet-switching computer networks such as the Internet, local, wide, metro, or other area networks, intranets, satellite networks, other computer networks such as voice or data mobile phone communication networks, or combinations thereof. The data processing system 105 of the system 100 can communicate via the network 110 with one or more computing devices, such as the one or more user devices 120. The network 110 may be any form of computer network that can relay information between the data processing system 105, the one or more user devices 120, and one or more information sources, such as web servers or external databases, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive or transmit data within the network 110.

The network 110 may include any number of hardwired or wireless connections. Any or all of the computing devices described herein (e.g., the data processing system 105, the one or more user devices 120, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 110. Any or all of the computing devices described herein (e.g., the data processing system 105, the one or more user devices 120, etc.) may also communicate wirelessly with the computing devices of the network 110 via a proxy device (e.g., a router, network switch, or gateway).

Each of the user devices 120 can include at least one processing circuit, which may, as an example, include at least one processor (e.g., processor(s) 150) and at least one memory (e.g., memory 155). The memory 155 can store processor-executable instructions that, when executed by the processor, cause the processor to perform one or more of the operations described herein. The one or more processors can include a microprocessor, an ASIC, an FPGA, a GPU, a TPU, etc., or combinations thereof. The one or more memory devices 155 can include, but are not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The user devices 120 can include one or more computing devices or servers that can perform various operations as described herein. For example, in some implementations, the user device 120 may be or may include, for example, a desktop or laptop computer (e.g., a tablet computer), a smartphone, a wearable device (e.g., a smartwatch), a personal digital assistant, and/or any other suitable computing device. In the example shown, the user device 120 is structured as a mobile computing device, namely a smartphone. The one or more user devices 120 can include any or all of the components and perform any or all of the functions of the computing system 700 described herein in conjunction with FIG. 7.

In some implementations, one or more of the user devices 120 can access various functions of the data processing system 105 through the network 110. For example, the user device 120 can access one or more functions of the data processing system 105 via a client application 145 of the user device 120 that is configured to display various user interfaces to the user device 120 via the network 110. As described in greater detail herein, a user of the user device 120 can provide one or more of various media inputs to the client application 145 of the user device 120 (e.g., via one or more inputs to a user interface of the user device 120).

The data processing system 105 can determine, using the one or more trained machine-learning models 130) an output based on the one or more of various media inputs and render responses on the user device 120 via the client application 145.

The client application 145 can be coupled to and supported, at least partly, by the data processing system 105. For example, in operation, the user client application 145 can be communicably coupled to the data processing system 105 and may perform certain operations described herein, such as receiving one or more media inputs and generating one or more user interfaces including one or more recommendations associated with the one or more media inputs that is displayed on a user device 120. In some embodiments, the client application 145 includes program logic stored in a system memory of the user device 120. In such arrangements, the program logic may configure a processor (e.g., processor(s) 150) of the user device 120 to perform at least some of the functions discussed herein with respect to the client application 145 of the user device 120. For example, the client application 145 may be downloaded from an application store, stored in the memory 155 of the user device 120, and selectively executed by the processor(s) 150. In other embodiments, the client application 145 may be hard-coded into the user device 120. In some embodiments, the client application 145 is a web-based application. As alluded to above, the client application 145 may be provided by the provider associated with the data processing system 105 such that the client application 145 supports at least some of the functionalities and operations described herein with respect to the data processing system 105. In some embodiments, the client application 145 may be executed by the processor(s) responsive to receiving various credentials of a user to access the client application 145 (e.g., biometric data, password credentials, etc.).

The user device 120 is further shown as including an I/O device 160. The I/O device 160 can include various components for providing outputs to a user of the user device 120 and receiving inputs from a user of the user device 120. For example, the I/O device 160 can include a display screen, a touchscreen, a mouse, a button, a keyboard, a microphone, a speaker, an accelerometer, actuators (e.g., vibration motors), including any combination thereof, in various embodiments. The I/O device 160 may also include circuitry/programming/etc. for operating such components. The I/O device 160 thereby enables communications to and from a user, for example communications relating to travel recommendations as described in further detail herein.

Figure 2:
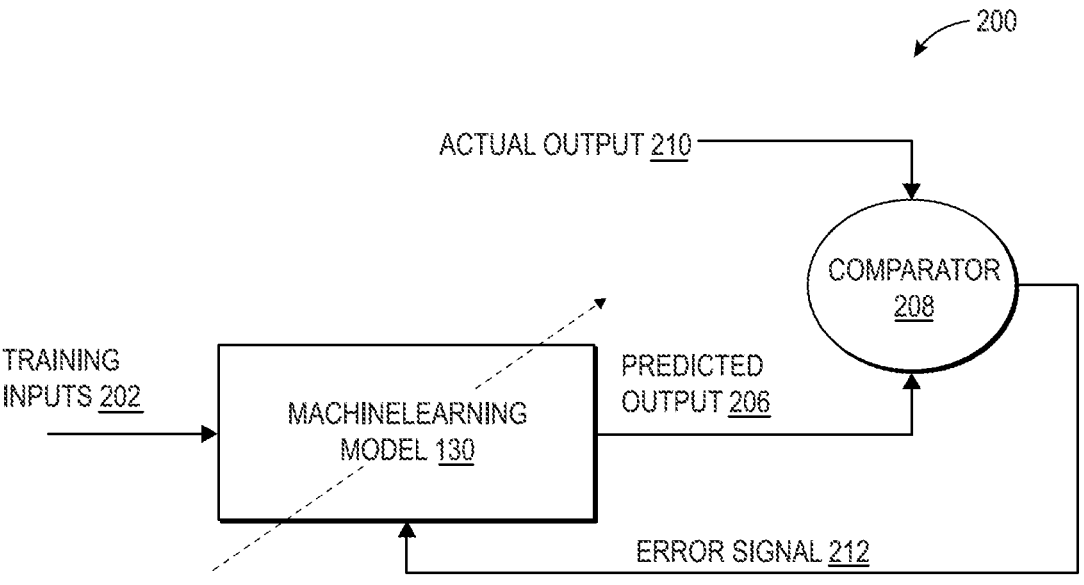
FIG. 2 depicts a block diagram of an architecture of a machine-learning model, in accordance with one or more implementations.
Figure 3:
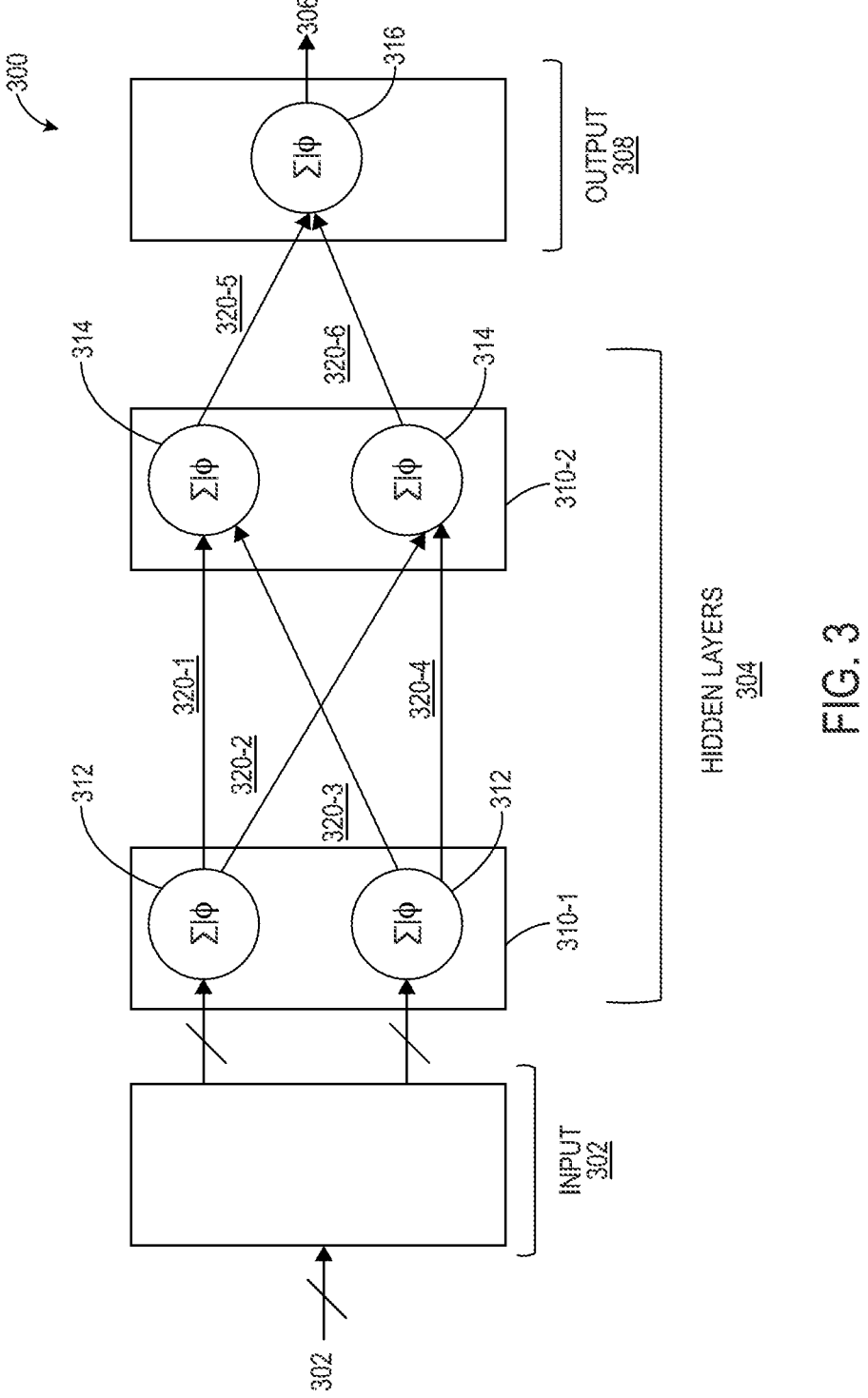
FIG. 3 depicts a block diagram of an architecture of a simplified neural network model, in accordance with one or more implementations.

The machine-learning model 130 may be structured to recognize patterns, trends, and the like in data and make one or more determinations. For example, FIGS. 2 and 3 represent example structures of the machine-learning model 130. With reference to FIG. 2, a block diagram of an example system 200 using supervised machine-learning is shown. Supervised learning is a method of training a machine-learning model (e.g., machine-learning model 130) given input-output pairs (e.g., stored in the training data 125). An input-output pair is an input with an associated known output (e.g., an expected output). The machine-learning model 130 may be trained on known input-output pairs (e.g., the training data 125) such that the machine-learning model 130 can learn how to predict known outputs given known inputs. Once the machine-learning model 130 has learned how to predict known input-output pairs, the machine-learning model 130 can operate on unknown inputs to predict an output.

The machine-learning model 130 may be trained based on general data and/or granular data (e.g., data based on a specific user) such that the machine-learning model 130 may be trained specific to a particular user. Training inputs 202 and actual outputs 210 may be provided to the machine-learning model 130. For example, as described in greater detail herein, training inputs 202 may include images and/or other medias, captions to describe the images, metadata, intent data, and/or other data stored in the data processing system 105. Training outputs 210 may include captions, intent data, and/or action data. The inputs 202 and actual outputs 210 may be received from the training data 125. For example, the training data 125 may contain various datasets including the images and/or other medias, captions, metadata, intent data, action data, etc., as described herein. Thus, the machine-learning model 130 may be trained to predict recommended actions based on the training inputs 202 and actual outputs 210 used to train the machine-learning model 130.

For example, the machine-learning model 130 may use various training inputs 202 (e.g., images, captions, metadata, and/or intent data (determined and/or express)) to determine and, particularly, predict various outputs 206 (e.g., actions), by applying the current state of the machine-learning model 130 to the training inputs 202. The comparator 208 may compare the predicted outputs 206 to actual outputs 210 to determine an amount of error or differences. For example, the predicted actions (e.g., predicted output 206) may be compared to the actual action data stored in the data processing system 105 (e.g., actual output 210). In other words, the actual outputs 210 may be based on historical data of recommended actions made to a user of the user device 120 and stored in the training data 125. In an illustrative non-limiting example, training inputs 202 may include an image of a known object (e.g., the Eiffel Tower, Mt. Rainier, etc.), a caption of the image (e.g., "The Eiffel Tower in Paris, France," "Mount Rainier stratovolcano in Washington, USA," etc.), metadata associated with traveling to the object (e.g., historical hotel prices, flight prices, flight paths, duration of stay, etc.), and/or historical intent data (e.g., a user books a trip to Paris, France, a user books a trip to Seattle, Washington, etc.). The actual outputs 210 may include actions a user took (e.g., booked the trip to Paris, France, booked the trip to Seattle Washington, etc.). The machine-learning model 130 may be trained based on the known training inputs 202 to identify an intent associated with an object (e.g., based on historical intent data) to determine an output based on the intent. In some implementations, as described in greater detail herein, the machine-learning model 130 may be structured to identify an explicit intent (e.g., based on historical intent data) and a thematic intent (e.g., alternative or additional intents beyond historical data). Therefore, the machine-learning model 130 may be trained to follow the same process when receiving an image (e.g., of an object) to generate a predicted output 206. While the actual and predicted outputs are described as recommended actions, it should be noted that the data processing system 105 may include a plurality of machine-learning models 130 that are each configured to generate the same or a different output category (e.g., image caption, intent, etc.) as described in greater detail with reference to FIG. 5.

During training, the error (represented by error signal 212) determined by the comparator 208 may be used to adjust the weights in the machine-learning model 130 such that the machine-learning model 130 changes (or learns) over time. The machine-learning model 130 may be trained using a backpropagation algorithm, for instance. The backpropagation algorithm operates by propagating the error signal 212. The error signal 212 may be calculated each iteration (e.g., each pair of training inputs 202 and associated actual outputs 210), batch and/or epoch, and propagated through the algorithmic weights in the machine-learning model 130 such that the algorithmic weights adapt based on the amount of error. The error is minimized using a loss function. Non-limiting examples of loss functions may include the square error function, the root mean square error function, and/or the cross-entropy error function.

The weighting coefficients of the machine-learning model 130 may be tuned to reduce the amount of error, thereby minimizing the differences between (or otherwise converging) the predicted output 206 and the actual output 210. The machine-learning model 130 may be trained until the error determined at the comparator 208 is within a certain threshold (or a threshold number of batches, epochs, or iterations have been reached). The trained machine-learning model 130 and associated weighting coefficients may subsequently be stored in memory or other data repository (e.g., a database) such that the machine-learning model 130 may be employed on unknown data (e.g., not training inputs 202). Once trained and validated, the machine-learning model 130 may be employed during a testing (or an inference phase). During testing, the machine-learning model 130 may ingest unknown data to predict future data.

With reference to FIG. 3, a block diagram of a simplified neural network model 300 is shown. The neural network model 300 may include a stack of distinct layers (vertically oriented) that transform a variable number of inputs 302 being ingested by an input layer 304, into an output 306 at the output layer 308.

The neural network model 300 may include a number of hidden layers 310 between the input layer 304 and output layer 308. Each hidden layer has a respective number of nodes (312, 314 and 316). In the neural network model 300, the first hidden layer 310-1 has nodes 312, and the second hidden layer 310-2 has nodes 314. The nodes 312 and 314 perform a particular computation and are interconnected to the nodes of adjacent layers (e.g., nodes 312 in the first hidden layer 310-1 are connected to nodes 314 in a second hidden layer 310-2, and nodes 314 in the second hidden layer 310-2 are connected to nodes 316 in the output layer 308). Each of the nodes (312, 314 and 316) sum up the values from adjacent nodes and apply an activation function, allowing the neural network model 300 to detect nonlinear patterns in the inputs 302. Each of the nodes (312, 314 and 316) are interconnected by weights 320-1, 320-2, 320-3, 320-4, 320-5, 320-6 (collectively referred to as weights 320). Weights 320 are tuned during training to adjust the strength of the node. The adjustment of the strength of the node facilitates the neural network's ability to predict an accurate output 306.

In some embodiments, the output 306 may be one or more numbers. For example, output 306 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As such, the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

While a neural network is described herein, it is noted that various other forms of classifiers may be implemented or used in the present disclosure (e.g., in the machine-learning model 130). For example, the machine-learning model 130 described herein may include or use a support vector machine, random forest, K-nearest neighbors, naïve bayes, or any other type or form of classifier.

Figure 4:
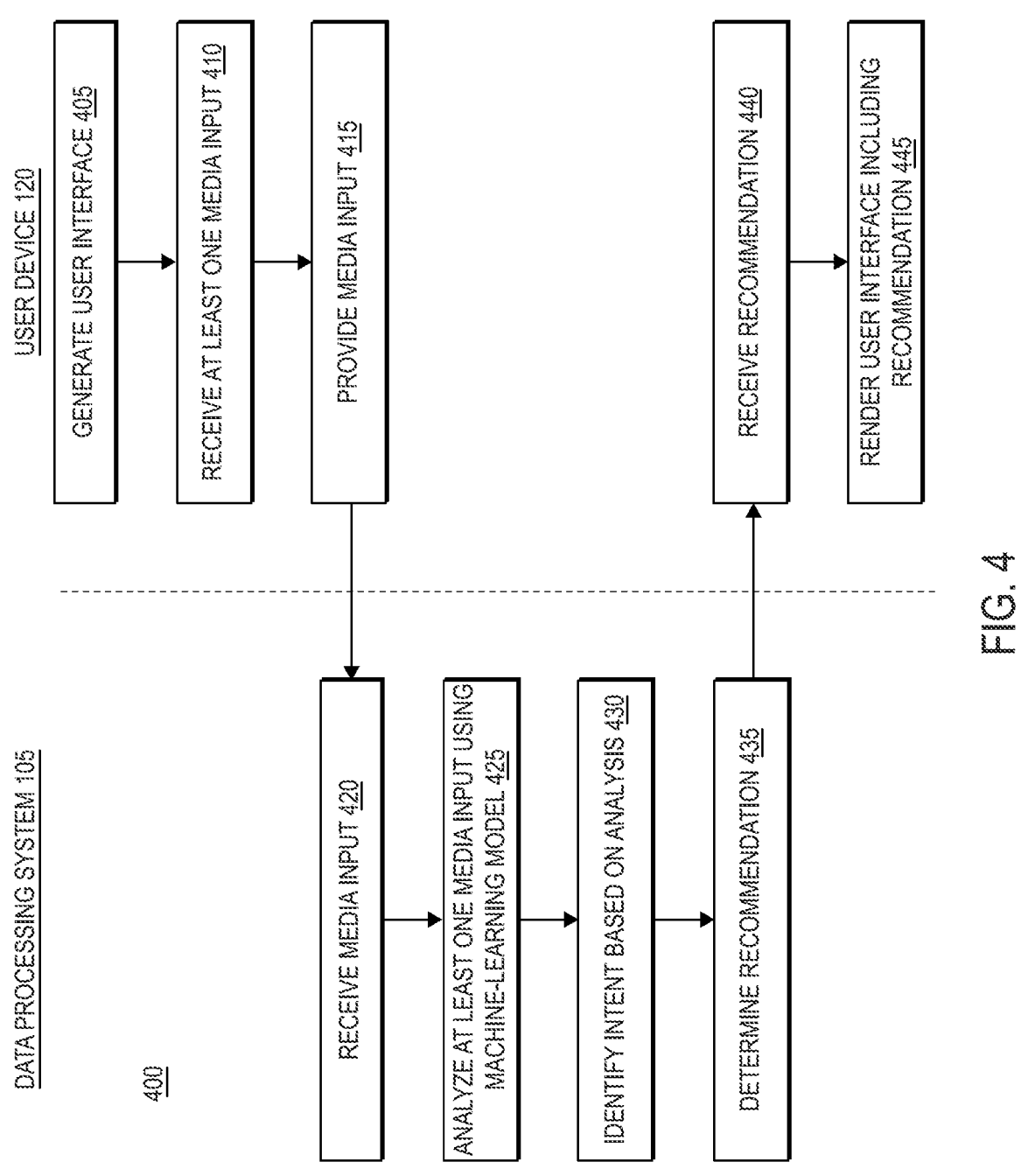
FIG. 4 depicts a flowchart of an example method of providing at least one intelligent recommendation based on one or more multi-modal inputs, in accordance with one or more implementations.

Based on the foregoing, referring now to FIG. 4, a flowchart of an example method 400 of generating and providing at least one intelligent travel recommendation based on a media input and/or a multi-modal input using the machine-learning model(s) 130 is shown, in accordance with one or more implementations. Although the operations of the method 400 are described as being performed by portions of a system (e.g., the data processing system 105 and a user device 120), it should be understood that the method 400 may be executed using any suitable computing system (e.g., the data processing system 105 of FIG. 1, the user device 120 of FIG. 1, the computing system 700 of FIG. 7, etc.). It may be appreciated that certain steps of the method 400 may be executed in parallel (e.g., concurrently) or sequentially. It may also be appreciated that while certain acts of the method 400 are shown as being performed by a specific device, some acts may be performed by another device of the system 100 in FIG. 1 and/or the computing system 700 of FIG. 7.

Figure 6A:
Figure 6B:
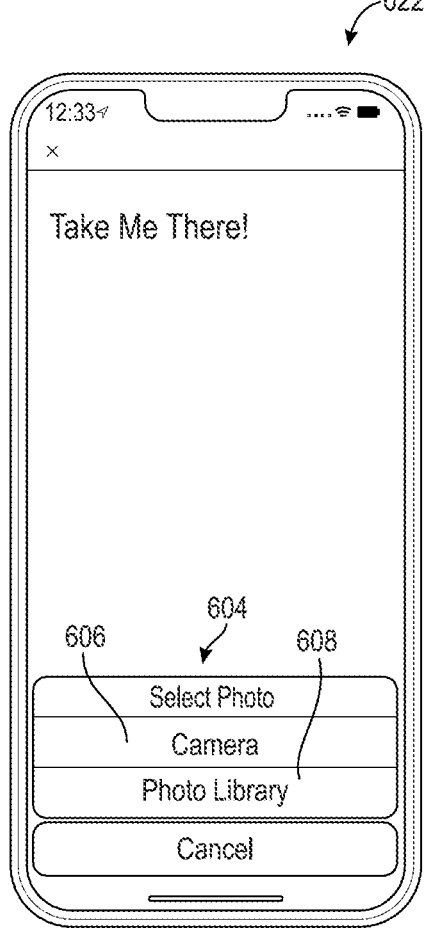

Referring briefly to FIGS. 6A and 6B, the user device 120 (e.g., mobile client application) or the data processing system 105 may be configured to generate a user interface 600 to be displayed on the user device 120, as depicted in FIG. 6A. The user interface 600 may include at least one selectable upload feature 602 (e.g., button, icon, feature with embedded link, etc.). The upload feature 602 may serve as a gateway or access point that, upon selection, launches a subsequent user interface (shown as user interface 622 in FIG. 6B) that allows a user to upload one or more media inputs and/or multimedia inputs (e.g., images). The user interface 600 may include at least one selectable option to pull the media or multimedia from a site, such as a social media site or other website. In some implementations, the user device 120 (e.g., the processor(s) 150) may be configured to receive an indication of a user input to the upload feature 602 responsive to a user selecting the upload feature 602. In some implementations, the data processing system 105 may be configured to receive an indication of a user input to the upload feature 602 responsive to a user selecting the upload feature 602 (e.g., via the network 110). Responsive to receiving the user input to the upload feature 602, the user device 120 or the data processing system 105 may be configured to generate and provide a second user interface 622. For example, FIG. 6B shows an example second user interface 622 according to a first implementation and FIG. 6C shows an example second user interface 622 according to a second implementation.

The second user interface 622 may include at least one media input list 604 that defines a channel, method, pathway, and/or route for a user to provide the at least one media input. In this example, the media input list 604 is shown to include a plurality of selectable media input options including a first option 606, shown as camera input option 606, and a second option 608, shown as an image upload option 608. Responsive to receiving an input to the camera input option 606, in some implementations, the data processing system 105 may be configured to communicate with a camera device of the user device 120 to activate (e.g., open the shutter to enable a picture-capturing mode) and receive image information. In some implementations, the user device 120 may be configured to cause a camera device of the user device 120 to activate. For example, the camera device can capture at least one image. Responsive to receiving an input to the second option, the image upload option 608, the data processing system 105 may be configured to pull at least one image stored in the user device 120 or the user device 120 may be configured to pull at least one image stored in the memory 155 of the user device 120 based on a user input. For example, the user device 120 or the data processing system 105 can access a library of images stored in the user device 120 on the user device 120. The user may select one image, or the user may select a plurality of images. In some implementations, the data processing system 105 or the user device 120 may be configured to receive text associated with the one or more images. For example, the user device 120 may be configured to generate and provide a dialogue box with the selected images such that the user device 120 may be configured to receive a user input including text to describe the selected images, or to describe an intent or request associated with the selected images. As an illustrative example, the user device 120 may receive a text input of "I'd like to go here, I think this image is from the same location." As another example, the user device 120 may receive text categorizing or tagging a media file (e.g., a tag indicating a location such as "Paris, France").

In some implementations, the list 604 may include a social media input link (e.g., a selectable link displayed through the client application 145). For example, the data processing system 105 or the user device 120 may be configured to receive an input to access the social media input link. Responsive to receiving the input, the data processing system 105 (e.g., via an application programming interface (API)) or the user device 120 may be configured to cause an application or website associated with the social media network to launch within the client application 145 on the user device 120 (e.g., to launch a window within the client application 145). The data processing system 105 or the user device 120 may be configured to access a user's account of a social media network responsive to receiving one or more log-in credentials associated with the account (e.g., biometric data, password, combination thereof, etc.). For example, the data processing system 105 or the user device 120 may be configured to generate a pop-up window within the client application 145 including a user's photos and media from the account associated with the log-in credentials. In some implementations, the user device 120 or the data processing system 105 may be configured to receive a user input to the window displayed on the user device 120 to receive a selection of one or more images or other graphics (e.g., responsive to a user selecting the one or more photos and media displayed in the window). In some implementations, the social media application may include an API that enables communication between the social media application and the client application 145. For example, the user device 120 (e.g., via the processor(s) 150) may be configured to launch a social media application on the user device 120 and render user's photos and media from the social media account. Responsive to a user selecting one or more photos, the social media application may be configured to provide the selected data to the data processing system 105 (e.g., via the API). In some implementations, the client application 145 may be configured to receive one or more photos or other media uploaded directly to the client application 145. Responsive to receiving the photos and/or other media, the client application 145 may be configured to generate and provide a prompt or notification on the user device 120 to begin an intelligent travel recommendation process based on the uploaded photos and/or other media.

The method 400 may include act, operation, or process 410, in which the user device 120 (e.g., via the one or more processor(s) 150) receives at least one media input. For example, as described herein with respect to act 405, the user device 120 may be configured to receive the media input in various ways, such as (i) by a user retrieving an image on the user device 120, (ii) via a camera device of the user device 120, and/or (iii) via a social media account by selecting one or more media files that are stored by a social media account. For example, FIG. 6D shows an example third user interface 624 with a received media input (e.g., image) from the user device 120 (e.g., by retrieving the image from the user device 120).

The method 400 may include act, operation, or process 415, in which the user device 120 (e.g., via the one or more processor(s) 150) provides the media input to the data processing system 105. As described herein, in some implementations, the data processing system 105 generates one or more user interfaces to receive the media input and provides the one or more user interfaces to the user device 120 over the network 110. In these implementations, the data processing system 105 may be continuously communicating with the user device 120 over the network to receive the media input via the user device 120. In some implementations, the user device 120 (e.g., via the client application 145) generates the one or more user interfaces to receive the media input. Responsive to receiving the media input(s), the user device 120 may be configured to transmit the media input(s) to the data processing system 105 over the network 110. In these implementations, the user device 120 may transmit the media input(s) to the data processing system 105 for processing only after receiving the media input(s) (e.g., as opposed to continuous data transfer between the user device 120 and the data processing system 105). This enables less network occupancy until only after the media inputs have been received and/or uploaded instead of continuous network occupancy, which can increase processing power of the data processing system 105 and reduce end-to-end latency between the data processing system 105 and the user device 120.

The method 400 may include act, operation, or process 420, in which the data processing system 105 receives the media input via the user device 120 (e.g., over the network 110). The method 400 may include act, operation, or process 425, in which the data processing system 105 (e.g., via the one or more processor(s) 135 and/or the machine-learning model 130) provides the received one or media inputs to the machine-learning model 130 and analyzes the media input. In some implementations, the data processing system 105 may be configured to analyze the media input to determine at least one recommendation (e.g., action), as described in greater detail herein.

Figure 5:
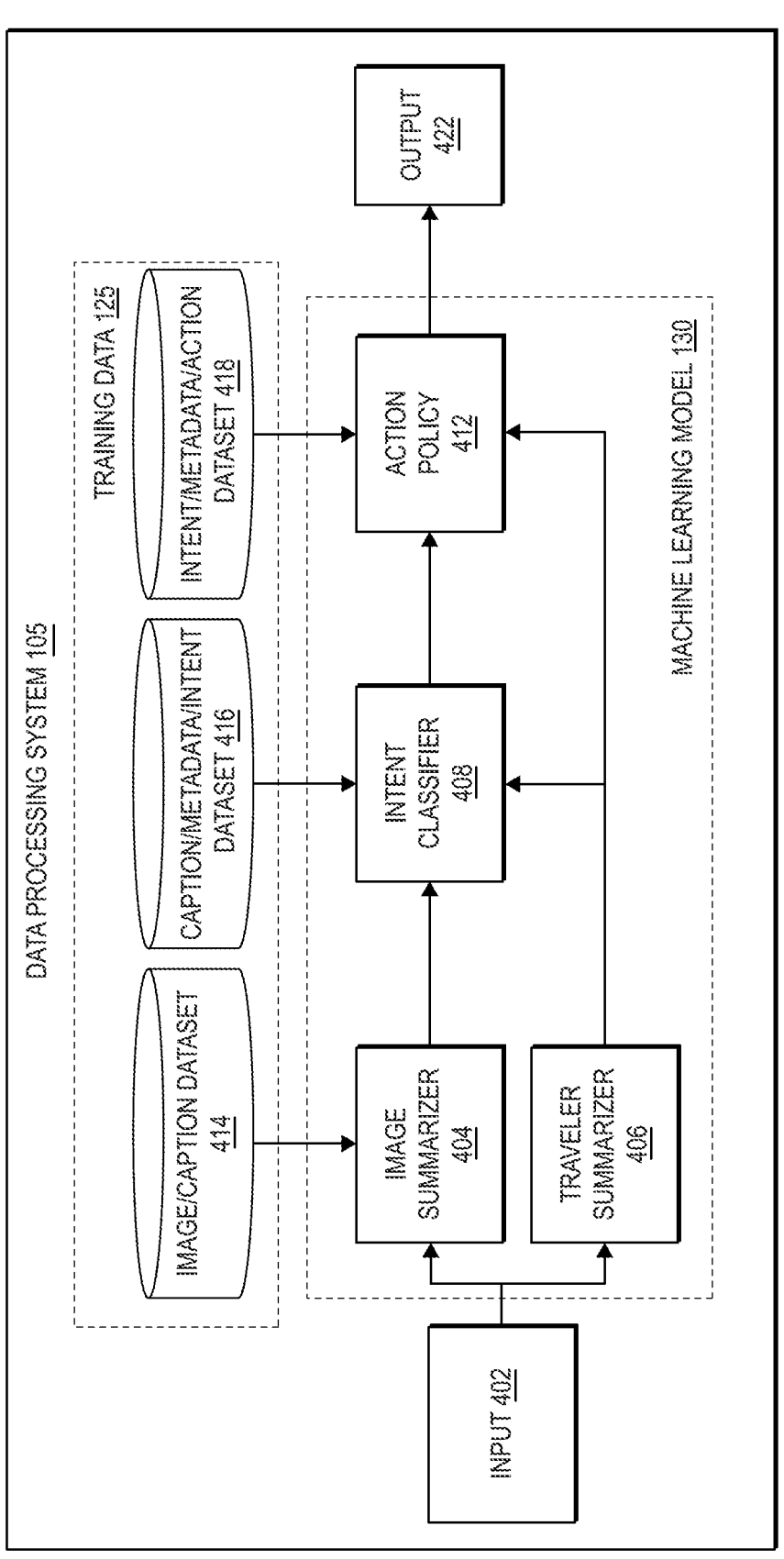
FIG. 5 depicts a flowchart of an example process of providing at least one intelligent recommendation based on a multi-modal input, in accordance with one or more implementations.

In some implementations, the data processing system 105 may be configured to determine the recommendation using a combination of the machine-learning model 130 and/or using various user inputs to the user device 120. For example, the various user inputs may include, but are not limited to, a text input to describe or tag a media input, information about the user (e.g., age, name, current location, etc.), among other inputs. As described with reference to FIGS. 2 and 3, the machine-learning model 130 may be trained using the training data 125. With reference to FIG. 5, the training data 125 may include a plurality of datasets. For example, the training data 125 may include at least one image/caption dataset 414, at least one caption/metadata/intent dataset 416, and/or at least one intent/metadata/action dataset 418, which are described in greater detail herein. The machine-learning model 130 may include at least one pre-processing learning model and/or at least one prediction model. For example, the pre-processing models may be or include an image summarizer model 404 and/or a traveler summarizer model 406. The prediction model may be or include an intent classifier model 408 and/or an action policy model 412.

In some implementations, the machine-learning model 130 may be configured to receive one or more inputs (e.g., via at least one user input to the user device 120) to analyze contextual information regarding a user and/or an evolving preference(s) of a user. For example, in some implementations, the data processing system 105 may be configured to extract historical data associated with a user (e.g., stored in the training data 125) and render one or more prompts to the user device 120 to update and/or confirm historical information and/or preferences of a user. For example, the training data 125 may store information of a previous search (e.g., media input) performed by a user indicating the user requested a hotel room for two people. Responsive to receiving a new search (e.g., media input) from the user, the data processing system 105 may be configured to transmit a prompt to the user device 120 asking the user to confirm the number of people, update the number of people, or provide various other preferences (e.g., indicate if any travelers are children, list any additional family members or friends, pets, disability needs, etc.). For example, the data processing system 105 may be configured to receive a search that indicates a user is traveling with children (or other user preferences or characteristics associated with a user). The data processing system 105 may be configured to receive one or more new searches and, based on previous searches, the data processing system 105 may be configured to predict that the new search will include children and/or other similar characteristics. The data processing system 105 may be configured to analyze such characteristics as evolving characteristics. For example, the data processing system 105 may be configured to generate and provide prompts to the user device 120 to update the predicted preferences and/or a user of the user device 120 may define changing preferences (e.g., addition of dependents, removal of dependents, etc.) in a stored user profile or social media site profile associated with the user via the user device 120. By way of example, as described herein, a user can link a user profile of a social media site with the data processing system 105 (e.g., via the client application 145). In some implementations, responsive to receiving a media input (e.g., image, graphic, etc.), the data processing system 105 may be configured to pull information associated with the user profile of the social media site to predict or determine contextual information of a user (e.g., number of family members which may change over time, age of dependents, family members or other people who may travel with the user, etc.). The data processing system 105 may be configured to generate a plurality of options for a user regarding a user's evolving features/characteristics (e.g., a changing number of children) and render the options as prompts on the user device 120 for a user to confirm or deny the options. The data processing system 105 may be configured to provide a response to the prompts and/or the stored preferences of the user profile as inputs to the machine-learning model 130. Beneficially, over time, the generated responses may take into account contextual information associated with the user to better tailor suggestions and recommendations to that user (e.g., recommending pet-friendly options to account for the system determining that the user is now a pet owner; recommending family friendly options to account for the system determining that the user now has children; etc.). Beneficially, by linking to profiles of the user (e.g., social media sites, payment platforms, etc.), the system may receive this contextual information without or substantially without a user input. This may save time and lead to more bespoke recommendations which are more appealing to the user.

The image summarizer model 404 can be trained using the image/caption dataset 414. For example, the image summarizer model 404 can be structured in a variety of architectures including convolutional neural network-based or transformer-based architectures that are pretrained on larger datasets paired with captions.

In some implementations, the image summarizer model 404 may be configured to analyze one or more tags associated with the image. For example, the image summarizer model 404 may be configured to receive a tag (e.g., metadata tag) as part of the media input upload process of the user device 120 (e.g., via a user input to a dialogue box, as described herein). The image summarizer model 404 may be configured to determine one or more captions, descriptions, or other information based on the tags by comparing the tag with a plurality of predetermined tags stored in a database. By way of illustrative example, a user may input text into a dialogue box displayed on the user device 120 to caption an image with the tag "Eifel Tower." The image summarizer model 404 may be configured to determine, based on the tag, predetermined information (e.g., destinations, travel itineraries, etc.) associated with the tag based on information stored in the database (e.g., that the Eifel Tower is associated with Paris, France). The image summarizer model 404 may be configured to provide the one or more captions/descriptions of the media input to the intent classifier model 408.

While such model is referred to as the "image" summarizer model 404, in some embodiments, the image summarizer model 404 may be configured to receive and analyze a plurality of different media types, including images and other media types, such as videos. For example, the image summarizer model 404 may be configured to receive at least one video input (e.g., video file) in addition to an image input and/or as an alternative to the image input. The video input may or may not include audio. The image summarizer model 404 may be configured to reduce the video to a plurality of still images or frames to analyze each still image or frame and detect prominent objects in each of the still frame images (e.g., in the foreground). In some embodiments, the image summarizer model 404 may be configured to transcribe audio within the video file into words such that the video file is reduced to words and images. For example, the determined and/or detected words in the video file can be used to generate a caption for the media input. In other embodiments, the image summarizer model 404 may ignore or discard the audio in the video file and, instead, analyze the video as only a plurality of still images as described herein.

The image/caption dataset 414 may include a plurality of training inputs 202 as described herein (e.g., images and/or other media) and a plurality of matching known outputs 210 (e.g., short captions, words, and/or phrases that describe the media) that facilitate fine-tuning the image summarizer model 404. Thus, and while the term "image" is utilized with image summarizer model, this designation is not meant to be limiting as the model 404 may utilize one or more of a variety of different media types (e.g., videos reduced to images or frames as described herein). Based on the images and captions, the image summarizer model 404 may be trained to recognize image patterns and/or determine captions (e.g., predicted output 206) for a received input media 402 (e.g., from the user device 120). In other words, the image summarizer model 404 may be trained and configured to detect features or objects in an image file, extract the features or objects, and determine one or more short descriptions associated with the extracted objects. For example, the image summarizer model 404 may be configured to analyze images using a pixel-by-pixel analysis. As another example, the image summarizer model 404 may be configured to break down a video file into a plurality of still images to analyze each still image by the respective pixels. As another example, the image summarizer model 404 may be configured to analyze audio within a video file using a speech-to-text algorithm. In some implementations, the image summarizer model 404 may be configured to tag or caption an image or video with text determined from audio within a video file (e.g., via an audio-to-text transcriber). The image summarizer model 404 may be configured to analyze images, videos, and/or other media using a variety of other additional or alternative analytical techniques.

Further, while the media input list 604 is shown to include an image upload option 608, it should be understood that the list 604 may include more input options including, but not limited to, a video input option. For example, responsive to receiving an input to the video input option, the data processing system 105 or the user device 120 may be configured to communicate with a camera device of the user device 120 to activate the camera (e.g., cause the camera to turn on) to capture video data. As another example, the data processing system 105 or the user device 120 may be configured to pull at least one video file stored on the user device 120. For example, the user device 120 may be configured to render a library of video files stored on the user device 120. The user device 120 may be configured to receive a user input indicating a selection of one or more of the video files. In other words, the media input may include an image file (e.g., .JPG, etc.) and/or a video file (e.g., .MOV). Thus, the "media input" may also be referred to as a multi-modal input herein due to comprising one or more file modality types (e.g., a video file and an image file).

In some implementations, the image summarizer model 404 may be configured to combine various media files to determine descriptions of the one or more media files. For example, when the image summarizer model 404 receives multiple media inputs, the image summarizer model 404 may be configured to analyze each media input and combine the analysis to determine a description. As an illustrative example, the image summarizer model 404 may be configured to receive an image of the White House and a video of the White House with a user saying, "visiting hours." The image summarizer model 404 may be configured to combine the image recognition analysis and voice recognition analysis of the video audio to determine a more accurate intent (e.g., a user wants to know the public visiting hours at the White House). In some implementations, the image summarizer model 404 may be configured to unequally weigh the analysis of one or more various media inputs. For example, the image summarizer model 404 may be configured to determine an intent using one media input analysis and ignoring or discarding a second media input analysis. As an illustrative example, the image summarizer model 404 may be configured to receive an image of the White House and a video including a user saying, "Washington D.C." The image summarizer model 404 may be configured to determine, based on image recognition, the White House is located in Washington D.C.

The traveler summarizer model 406 may be configured to generate and provide a vector of discrete and continuous values (e.g., a summary vector), serving as a numerical characterization of a user associated with the user device 120. In some implementations, the traveler summarizer model 406 may be configured to receive context information from the user device 120 via a plurality of manual inputs to the user device 120. For example, the traveler summarizer model 406 may be configured to receive context data associated with a user (e.g., age, name, address, etc.) of the user device 120 and transform the data into a numerical vector. In some implementations, the mean and variance of continuous features are scaled to 0 and 1, respectively, and the discrete values are represented as a binary vector. The context data may include, but is not limited to, a user's preferences, a user's location, a user's travel history, a user's spending habits, and/or other various data associated with a user of the user device 120. The traveler summarizer model 406 may be configured to provide the summary vector to the intent classifier model 408 and/or to the action policy model 412.

The method 400 may include act, operation, or process 430, which includes the data processing system 105 identifying an intent. For example, the intent classifier model 408 can be trained using the caption/metadata/intent dataset 416. The caption/metadata/intent dataset 416 may include a plurality of training inputs 202 including a caption and/or description of an image (e.g., short captions, descriptions, words, and/or phrases that describe media). The caption/metadata/intent dataset 416 may include a plurality of training outputs 210 including metadata associated with traveling and/or historical intent data associated with uploaded media. The metadata may include, but is not limited to, various travel metadata including lodging bookings (e.g., duration, cost, location, local language, loyalty brand, etc.), flight bookings (e.g., origin, destination, loyalty brand, cost, mileage, etc.), and/or application engagement (e.g., click path derivatives of a user interface 600, feature utilization rates, features utilized prior to a sale, etc.). The intent data (e.g., a user's intention) associated with uploaded media may include, but is not limited to, various users' previously recognized intent associated with various captions (e.g., historical intent data). In some implementations, the intents may be associated with a point of interest (e.g., an object, a monument, etc.) of a specific destination. In some implementations, the intents may be associated with a point of interest that is not specific to a destination. As an illustrative example, for an image of golf clubs, one previously recognized intent may be finding a golf course or golf shop nearby. As another example, for an image of the ocean, one previously recognized intent may be planning a trip to a tropical island. The intent classifier model 408 may be trained to output a determined intent distribution (e.g., predicted output 206) of a user based on the caption from the image summarizer model 404 and the summary vector from the traveler summarizer model 406. In some implementations, the intent with the highest probability value (with ties broken at random) is passed as an output.

The action policy model 412 may be trained using the intent/metadata/action dataset 418. The intent/metadata/action dataset 418 may include a plurality of training inputs including an intent associated with a media caption. The intent/metadata/action dataset 418 may include a plurality of training outputs including metadata associated with traveling and/or historical action data associated with the intent. The action data associated with an intent may include, but is not limited to, users' previously recognized action(s) associated with an intent (e.g., historical action data). As an illustrative example, for an intent of finding a golf course nearby, one previously recognized action may be scheduling a tee time at a local golf course. As another example, for an intent of planning a trip to a tropical island, one previously recognized action may be an itinerary outlining a trip to Hawaii (e.g., including flights, hotels, car rentals, etc.). The action policy model 412 may be trained to determine a recommended action distribution (e.g., output 422) based on the determined intent from the intent classifier model 408 and the summary vector from the traveler summarizer model 406. In some implementations, the action policy model 412 will return the top-n (for example, top-3 or top-5) recommendations with their probabilities.

In some implementations, the action policy model 412 may be trained to determine a plurality of recommended actions based on the determined intent. For example, the action policy model 412 may be configured to determine a plurality of possible recommended actions and/or intents (e.g., when the action policy model 412 cannot determine a known intent, location, etc. associated with an image or other media). In some implementations, the action policy model 412 may be trained to provide similar recommended actions when the action policy model 412 determines certain determined actions are not possible due to external factors (e.g., the action policy model 412 determines, based on stored data, that a volcano in Indonesia erupted and all travel to Indonesia has been halted, and instead determines the next most similar recommendation action or actions based on the inputs).

Both the intent classifier model 408 and action policy model 412 may be trained through a supervised learning pipeline as described herein using a general function approximator optimized on a multi-class cross entropy objective function. Each model's weights are optimized on labeled data, produced by subject matter experts (SMEs).

In determining a performance evaluation of each model, quality control measures may be monitored for caption evaluation, intent classification, and action selection. For example, a "yes/no" question such as, "Does this caption describe this image?" can be collected across an evaluation dataset of images and captions produced by the image summarizer model 404. The percentage of captioned images with majority vote 'yes' may be an appropriate performance measure for the image summarizer model 404. For the intent classifier model 408, a hold out sample of the caption/metadata/intent dataset 416 can be used to measure the classification performance. The standard classification measures (FBeta-score, precision, recall) can be utilized to measure performance. For the action policy model 412, a holdout sample of intent/metadata/action dataset 418 can be used to measure action selection performance. Again, the standard classification measures (FBeta-score, precision, recall) can be utilized to measure performance.

Referring back to FIG. 4, the method 400 may include act, operation, or process 435, in which the data processing system 105 (e.g., via the one or more processor(s) 135 and/or the machine-learning model 130) determines and provides a recommendation (e.g., recommended action) based on the analysis. For example, the machine-learning model 130 may be trained to produce an output 422 in which the output 422 includes the recommendation (e.g., the recommended action determined by the action policy model 412). The recommendation may include, but is not limited to, a travel itinerary, a destination location, a recommendation to purchase tickets or schedule an appointment, an optimized time of year to visit a location, and/or various other recommended actions described herein. In some implementations, the machine-learning model 130 may be configured to determine a plurality of recommendations (e.g., destinations and/or information regarding the destinations). As an illustrative example, the machine-learning model 130 may receive an image of a church. The machine-learning model 130 may be configured to extract features of the image (e.g., a steeple, stained glass windows, etc.). The machine-learning model 130 may be configured to output a plurality of recommendations based on the extracted features, including one or more destinations having a church, as well as additional information (e.g., location, known features, etc.) about the destinations.

The method 400 may include act, operation, or process 440, in which the user device 120 receives the recommendation. For example, the data processing system 105 may be configured to provide the determined recommended action to the user device 120 to be displayed and interacted with through the client application 145.

The method 400 may include act, operation, or process 445, in which the user device 120 generates and provides the various outputs of the machine-learning model 130 (e.g., the recommendations) on a user interface. For example, with reference to FIGS. 6E-6H, the data processing system 105 or the user device 120 may be configured to generate and provide a fourth user interface 626 to the user device 120. The fourth user interface 626 may include various details of the analysis of the machine-learning model 130 and/or the determined output 422. For example, the fourth user interface 626 may include the media input received by the user device 120, the extracted features of the machine-learning model 130, one or more recommended actions, and/or one or more selectable features to interact with the recommended actions.

In some implementations, the data processing system 105 may be configured to be used in a chatbot interface (e.g., ChatGPT provided by OpenAI) to enable image searching. For example, the data processing system 105 may be configured to enable the chatbot to analyze an image inputted into the chatbot and determine and output a recommended action to the user device 120 as described herein. As an example, the data processing system 105 may be configured to render a prompt via the chatbot interface asking a user of the user device 120 "where do you want to go?" The user device 120 may be configured to receive an inputted image into the chatbot interface, such as an image of the Eiffel Tower. The data processing system 105 may be configured to receive the image via the chatbot interface, analyze the image as described herein, and output a recommendation (e.g., Paris, France trip experiences) to provide the recommendation to the user device 120.

FIGS. 6E-6H each show various example fourth user interfaces 626 in which the machine-learning model 130 determined a destination associated with the received media input. For example, as shown in the example user interfaces 626 in FIGS. 6E-6F, the fourth user interface 626 may include the uploaded and/or captured media 610 provided by the user, a caption 612 associated with the media 610, a location 614 associated with the media 610 (e.g., in map form, in address form, as applicable), and/or a listing of recommended actions and/or interactive recommendations 616. The listing of recommended actions 616 may correspond to the generated determined action output 422 of the machine-learning model 130. For example, the listing of actions 616 may include various selectable actions 618 including, but not limited to, a hotel booking action, a transportation booking option, an activity booking option, a recommended activity, a recommended location, a recommended place to stay, a person or organization to contact, a policy, article, or other media to review, a link to a third party service, itinerary creation and/or modification for a trip, product searches, customer support, product comparisons, upcoming and past bookings, product promotions/ seasonal discounts, recommended retail purchases, frequently asked questions with answers, points of interests near a detected location, popular activities, popular places to stay, other travel information, etc. For example, the selectable actions 618 may serve as a gateway or access point that, upon selection, launches a subsequent user interface.

Figures 6E, 6F:
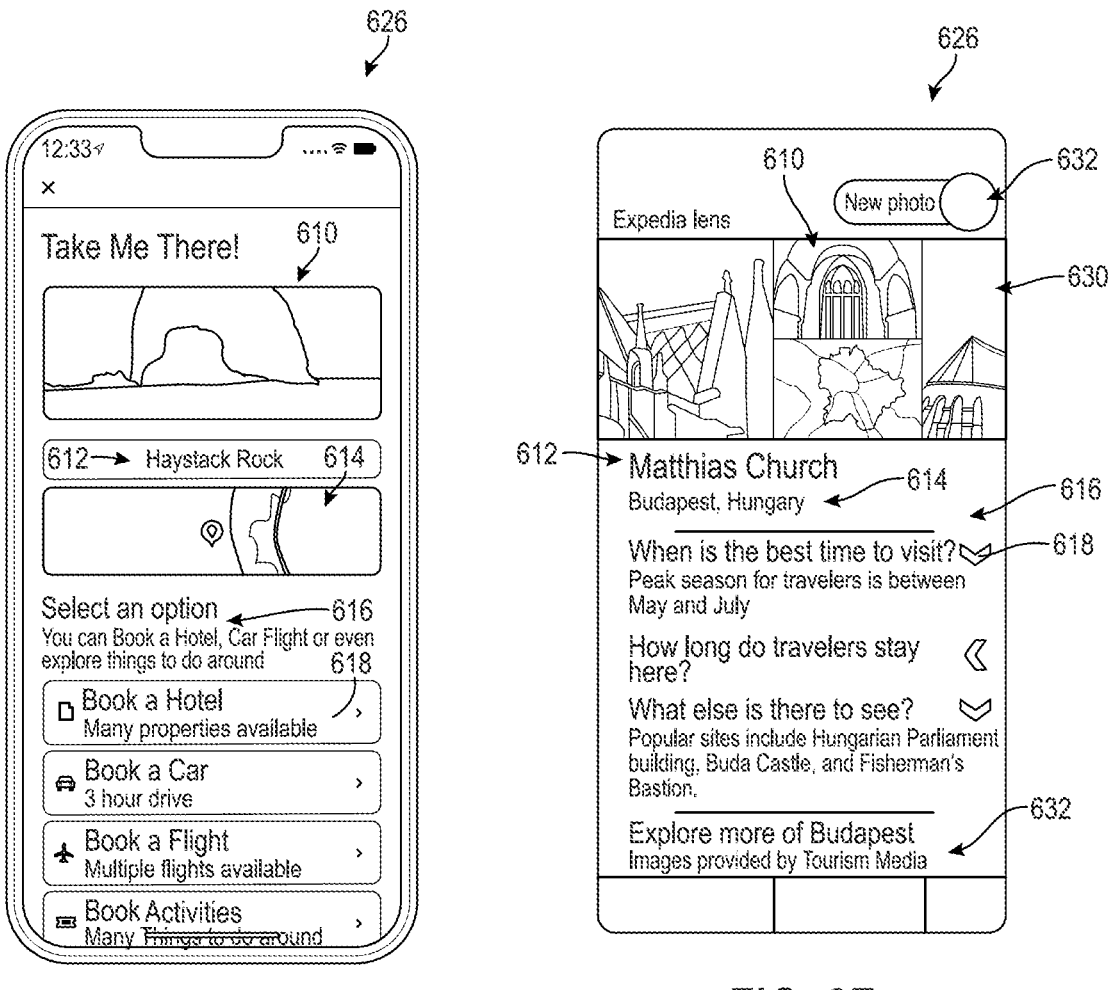

With reference to the example user interface 626 shown in FIG. 6E, responsive to receiving an input to one or more actions 618 (e.g., to book a hotel), the data processing system 105 may be configured to begin and/or complete the action 618. For example, responsive to receiving a user input to an action 618 to book a hotel, the data processing system 105 may be configured to generate a fifth user interface 628, as shown in FIG. 6I, including a list 620 of hotel rooms available for a user to select. This example is illustrative. The fifth user interface 628 may include a variety of components applicable to the selected action 618.

With reference to the example user interface 626 shown in FIG. 6F, responsive to receiving an input to one or more actions 618 (e.g., a commonly asked question), the data processing system 105 may be configured to render an answer to the question (e.g., based on an output of the machine-learning model 130). In some implementations, as shown in FIG. 6F, the user interface 626 may include a plurality of images 630. In some implementations, the plurality of images 630 may include the plurality of images selected or uploaded by a user of the user device 120. In some implementations, one or more of the plurality of images 630 may be outputted from the machine-learning model 130 (e.g., one or more images associated with the identified output, associated with the metadata tag, etc.). For example, in instances in which the machine-learning model 130 detects an object (e.g., a point of interest) associated with an image, the machine-learning model 130 may be configured to provide additional photos of the point of interest. The user interface 626 may include a list 632 of additional recommendations (e.g., outputs) determined by the machine-learning model including corresponded images and/or other media 634, as shown in greater detail in FIG. 6G. For example, the additional recommendations may include information and photos regarding the location of the point of interest. In some implementations, the list 632 may include at least one selectable action 618 for a user to view more information. For example, the selectable action 618 may serve as a gateway or access point that, upon selection, launches a subsequent user interface.

Figures 6G, 6H:
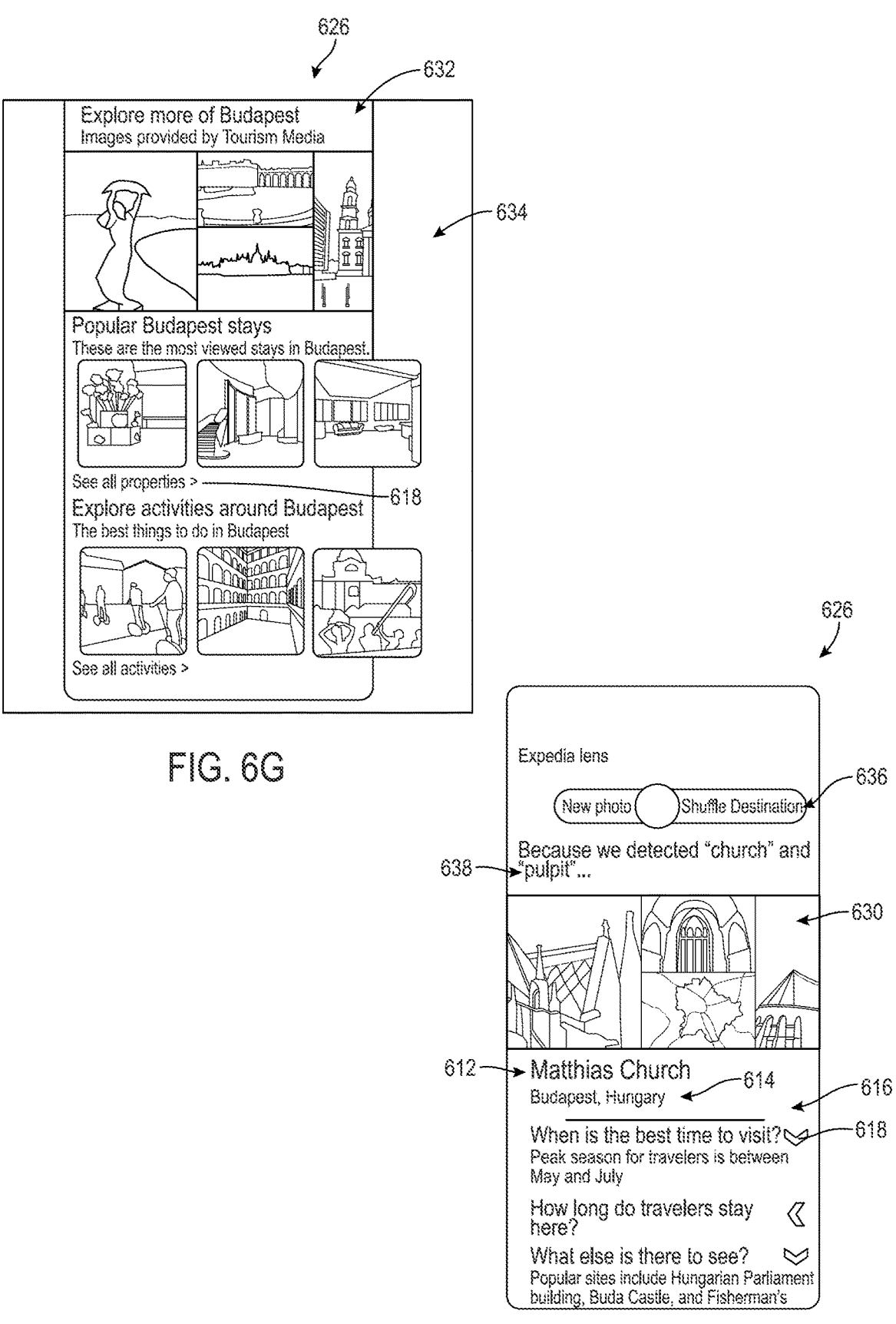
Figure 6I:
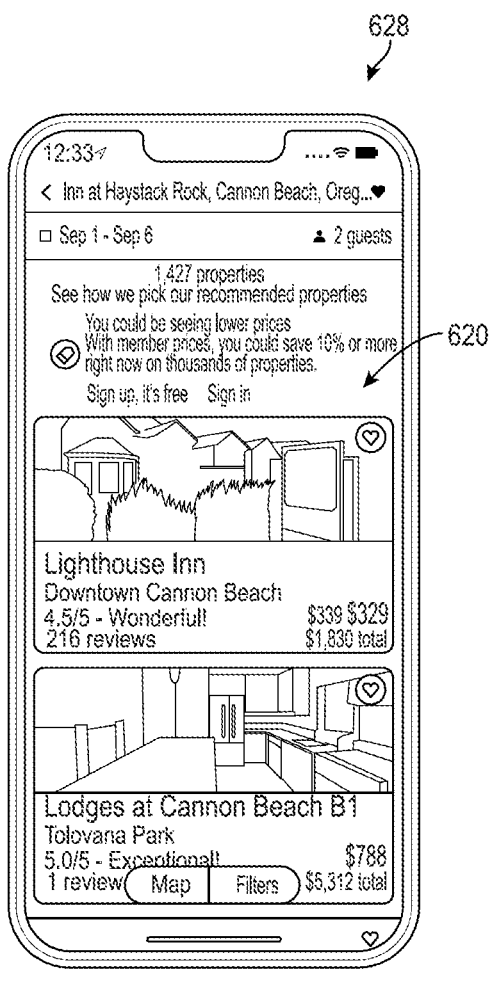

While FIGS. 6E and 6F depict user interfaces 626 in which the machine-learning model 130 determined a location based on the one or more uploaded images, FIG. 6H depicts an example user interface 626 in which the machine-learning model 130 determined a plurality of possible destination locations based on detected features of the received image and/or other media inputs. For example, the location 614 displayed on the user interface 626 may be one of a plurality of determined locations. In some implementations, the user interface 626 may include one or more features 638 detected by the machine-learning model 130 that resulted in the determined location(s). The user interface 626 may include a shuffle option 636 for a user to view more possible locations associated with the features 638. For example, responsive to receiving a user input to the shuffle option 636, the data processing system 105 may be configured to display information regarding a second location.

With reference to FIG. 8, a table 800 depicting various non-limiting illustrative examples is provided. As a first example, a user may upload and/or take an image of a bug in a bathroom sink (i.e., a media input indicative of an experience and, in this instance, an undesirable, displeasing, or unwanted experience). In this instance, the data processing system is configured to determine an intent from the media input, which is distinguishable from the earlier examples herein regarding identifying a destination or experience for a user. Here, the system is configured to determine a sentiment or intent of the user from the at least one media input. In this regard, the machine-learning model 130 may be configured to determine, based on the image of the bug and context of a user indicating the user is staying at a specific hotel, an understood intent of the image may include an issue or problem with the hotel room. The machine-learning model 130 may be configured to generate and provide various recommendations to the user including providing the hotel's front desk phone number and/or connecting the user to a travel agent to find new accommodations.

As a second example, a user may upload and/or take an image of a flat tire on a car (another example of a determining an intent associated with an undesirable occurrence or event). The machine-learning model 130 may be configured to determine, based on the image of the tire and context of a user indicating the user owns a vehicle, an understood intent of the image may include an inoperable vehicle. The machine-learning model 130 may be configured to generate and provide various recommendations to the user including reviewing a user's insurance policy and/or providing the user an option to book a rental car.

As a third example, a user may take a picture of a line of people at an airline service desk. The machine-learning model 130 may be configured to determine, based on the picture and context of a user indicating the user booked a flight for that day, an understood intent of the picture may include a flight cancellation or delay. The machine-learning model 130 may be configured to generate and provide various recommendations to the user including finding a new flight to the destination airport.

In some implementations, the data processing system 105 may be configured to receive various inputs (e.g., to one or more user interfaces of the user device 120) to refine the output of the machine-learning model 130. For example, one or more user interfaces provided via the client application 145 of the user device 120 may include a selectable feature for a user to provide feedback regarding the recommended action. The selectable feature may include a binary feedback response (e.g., yes/no, thumbs up/thumbs down, etc.) to indicate if the recommended action is relevant to the user. In some implementations, the selectable feature may include a dialogue box for a user to enter texts to further refine an output of the machine-learning model 130. In some implementations, the data processing system 105 may be configured to store each search (e.g., based on uploaded media input) in a database such that the data processing system 105 may be structured to pull historical media inputs and recommendations responsive to a request to view previous searches (e.g., responsive to a user request to see search history). In some implementations, the data processing system 105 may be configured to add the one or more searches (e.g., media inputs and associated recommendation) and/or the one or more feedback responses to the training data 125. For example, the data processing system 105 may be configured to add the feedback to the training data 125 to facilitate training the machine-learning model 130 to improve the model 130 over time (e.g., at least for the specific user based on user preferences).

In some implementations, one or more datasets of the training data 125 may include explicit and/or thematic intents and actions. For example, the explicit intents and/or actions may be or include a direct, stated, and clear intent or corresponding action of a user (e.g., an image of a flat tire may indicate a user needs to repair the tire, replace the tire, and/or get a rental car). The thematic intents and/or actions may be or include indirect intents or actions that are based along the same theme as explicit intents and actions, but extrapolated beyond known explicit intents (e.g., an image of a flat tire may indicate a user wishes to file a complaint to the local government regarding damaged roads). The training datasets may include a combination of explicit previous action patterns and thematic action patterns that a user has not explicitly taken. In some implementations, the caption/metadata/intent dataset 416 may include both explicit intent data and thematic intent data while the intent/metadata/action dataset 418 may include both explicit action data and thematic action data to train the respective intent classifier model 408 and the action policy model 412. Thus, the intent classifier model 408 may be trained to output both explicit and thematic intents and the action policy model 412 may be trained to output various explicit and thematic recommendations. By way of illustrative example, the data processing system 105 may be configured to receive an image of a convertible sports car from the user device 120. The machine-learning model 130 may be trained to output both an explicit recommended action and a thematic recommended action. For example, the machine-learning model 130 may be configured to determine an explicit intent is a rental car booking based on previous rental car history of a user. The machine-learning model 130 may be configured to determine a thematic intent is a sports car activity that a user had not necessarily attended. Based on the intents, the machine-learning model 130 may be configured to recommend a car rental with an inventory of exotic automobiles as an explicit action to the user device 120 and/or a car-centered event or point of interest (e.g., automobile museum, upcoming races, etc.) as a thematic recommended action to the user device 120. As another illustrative example, the data processing system 105 may be configured to receive an image of climbing shoes from the user device 120. The data processing system 105 (e.g., using the machine-learning model 130) may be configured to determine an explicit intent is a climbing interest based on a user's travel and/or transaction history and a thematic intent is outdoor rock-climbing and/or hiking sites. The machine-learning model 130 may be configured to output an explicit recommended action including guided climbing tours and a thematic recommended action including information of a selection of rock-climbing sites to plan a trip. In some implementations, the machine-learning model 130 may be structured to include a tuple consisting of a plurality of elements (e.g., media data, an explicit intent character string, a thematic intent character string, explicit action character string, and/or thematic action character string). By way of illustrative non-limiting example, the machine-learning model 130 may be configured to receive and detect an image (e.g., media data) containing rock climbing shoes. The machine-learning model 130 may be configured to determine additional elements of the tuple including, for example, an explicit intent including "rock climbing interest," a thematic intent including "outdoor rock-climbing sites," an explicit action including "recommended guided rock-climbing tours," and a thematic action including "share information on a selection of rock-climbing sites." This example is for illustrative purposes.

In some implementations, the data processing system 105 may be configured to store demographic and/or previous transaction (e.g., shopping) behaviors of a user of the user device 120. For example, the data processing system 105 may include at least one activity-product mapper that includes a list of possible recommended actions and identifies a subset of actions that may include products or services associated with the action (e.g., by comparing the actions with a listing of predetermined products or services stored in the data processing system 105, by comparing the actions with historical transaction and/or demographic data or a user, etc.). The data processing system 105 may be configured to cross-identify the products associated with the activities and store the cross-identified products or services in a data structure. The data processing system 105 (e.g., using the machine-learning model 130) may be configured to re-rank a listing of recommended actions based on those identified to have a potential product or service associated with the action to output those actions and provide such actions to the user device 120.

By way of illustrative example, the data processing system 105 may be configured to receive an image of a pair of skis from the user device 120. The data processing system 105 may receive a location of the user device 120 (e.g., via geolocation data of the user device 120). The data processing system 105 (e.g., via the machine-learning model 130 and/or based on a stored activity-product mapper) may be configured to determine that a recommended action is skiing at a resort. The data processing system 105 may be configured to determine, using the stored demographic data, that various users within a predetermined distance of the location purchased a ski pass to a resort within a distance of the user's device 120. The data processing system 105, using the machine-learning model 130, may be configured to output the recommended action of purchasing a ski pass to the user device 120. As another example, the data processing system 105 may be configured to receive an image of a bag of golf clubs. The data processing system 105, using the machine-learning model 130 may be configured to determine a recommended action is golfing and that users within the area have purchased clubs at a local golf shop. The data processing system 105 may determine based on the analysis of the golf clubs that the golf clubs are worn, predefined old (e.g., by corresponding with a make and model that predates a certain date), and/or other characteristics that may indicate repair/replacement of the clubs. The data processing system 105 may be configured to output a recommendation to visit the local golf shop to facilitate a repair or replacement. Alternatively, the data processing system 105 may determine that the clubs appear new or not worn and, instead, provide an output that recommends nearby golf courses (e.g., within a predefined distance of a location of the user using location services). As yet another example, the data processing system 105 may be configured to receive a picture of a pool and a location of a vacation rental home. The data processing system 105, using the machine-learning model 130 may be configured to determine a recommended action is swimming and that users within the area have purchased swimming toys at a store within a predetermined distance of the location. The data processing system 105 may be configured to output a recommendation to visit and/or purchase the swimming toys at the store.

In some implementations, performance evaluation of the activity-product mapper will include revenue generated per product and cross-sell conversation rates. The standard evaluation measures may also be included on a holdout dataset. Again, the standard classification measures (FBeta-score, precision, recall) can be utilized to measure performance. The evaluation may include reranked recommendations, in which recommendations are augmented with cross-sell opportunities and products are reranked and a user will opt-in to opportunities they wish to pursue.

Figure 7:
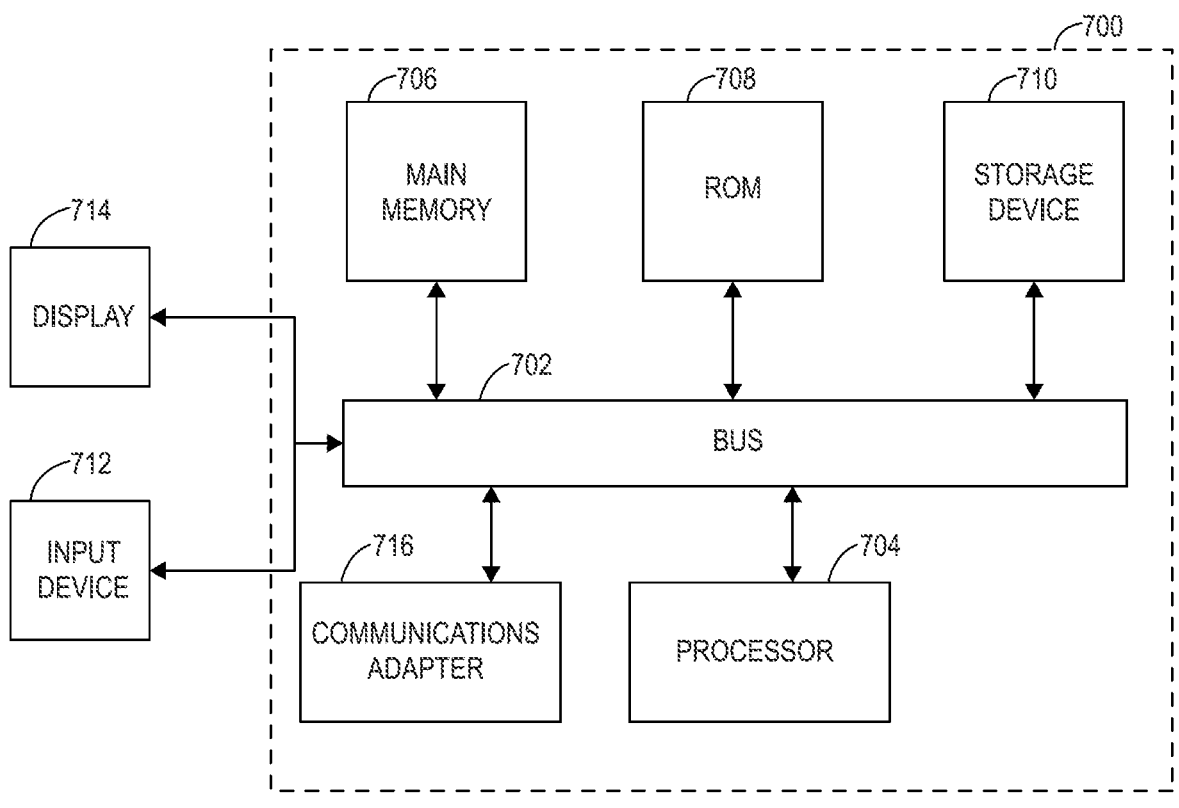
FIG. 7 is a block diagram of an example computing system suitable for use in the various arrangements described herein, in accordance with one or more example implementations.

FIG. 7 illustrates a component diagram of an example computing system suitable for use in the various implementations described herein, according to an example implementation. In a non-limiting example, the computing system 700 may implement any of the data processing system 105 or one or more user devices 120 of FIG. 1, or various other example systems and devices described in the present disclosure.

The computing system 700 includes a bus 702 or other communication component for communicating information and a processor 704 coupled to the bus 702 for processing information. The computing system 700 also includes main memory 706, such as a RAM or other dynamic storage device, coupled to the bus 702 for storing information, and instructions to be executed by the processor 704. Main memory 706 may also be used for storing position information, temporary variables, or other intermediate information during execution of instructions by the processor 704. The computing system 700 may further include a ROM 708 or other static storage device coupled to the bus 702 for storing static information and instructions for the processor 704. A storage device 710, such as a solid-state device, magnetic disk, or optical disk, is coupled to the bus 702 for persistently storing information and instructions.

The computing system 700 may be coupled via the bus 702 to a display 714, such as a liquid crystal display, or active-matrix display, for displaying information to a user. An input device 712, such as a keyboard including alphanumeric and other keys, may be coupled to the bus 702 for communicating information and command selections to the processor 704. In another implementation, the input device 712 has a touch screen display. The input device 712 may include any type of biometric sensor or a cursor control, such as a mouse, a trackball, or cursor direction keys, for communicating direction information and command selections to the processor 704 and for controlling cursor movement on the display 714.

In some implementations, the computing system 700 may include a communications adapter 716, such as a networking adapter. Communications adapter 716 may be coupled to bus 702 and may be configured to enable communications with a computing or communications network or other computing systems. In various illustrative implementations, any type of networking configuration may be achieved using communications adapter 716, such as wired (e.g., via Ethernet), wireless (e.g., via Wi-Fi, Bluetooth), satellite (e.g., via GPS) pre-configured, ad-hoc, LAN, WAN, and the like. The communications adapter 716 can enable communication via the network 110 of FIG. 1, for example.

According to various implementations, the processes of the illustrative implementations that are described herein may be achieved by the computing system 700 in response to the processor 704 executing an implementation of instructions contained in main memory 706. Such instructions may be read into main memory 706 from another computer-readable medium, such as the storage device 710. Execution of the implementation of instructions contained in main memory 706 causes the computing system 700 to perform the illustrative processes described herein. One or more processors in a multi-processing implementation may also be employed to execute the instructions contained in main memory 706. In alternative implementations, hard-wired circuitry may be used in place of or in combination with software instructions to implement illustrative implementations. Thus, implementations are not limited to any specific combination of hardware circuitry and software.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The implementations described herein have been described with reference to drawings. The drawings illustrate certain details of specific implementations that implement the systems, methods, and programs described herein. Describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. In a non-limiting example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more processors, ASICs, FPGAs, GPUS, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, in a non-limiting example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the implementations might include a general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard disks, optical disks, etc. In other implementations, the volatile storage media may take the form of RAM, TRAM, ZRAM, etc. Combinations of the above are also included within the scope of machine-readable media. In this regard, machine-executable instructions comprise, in a non-limiting example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. In a non-limiting example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A computing system, comprising:
a network interface configured to communicate with a user device;

a processing circuit comprising at least one processor and at least one memory, the at least one memory structured to store instructions that are executable to cause the at least one processor to:
receive, via the network interface and from the user device, a media input;
extract, using a machine-learning model, at least one feature of the media input;
receive a user preference associated with a user of the user device;
receive contextual information associated with the user device;
identify, using the machine-learning model and based at least partly on the user preference and the contextual information, at least one intent associated with the at least one extracted feature of the media input;
determine, using the machine-learning model, at least one action policy based on the at least one identified intent;
generate a user interface comprising the media input, the at least one extracted feature of the media input, and the at least one action policy;
provide, via the network interface, the user interface to the user device;
receive, via the network interface and via an input to the user interface, an indication of a selection of the at least one action policy displayed on the user interface;
generate a second user interface comprising a plurality of options associated with the selected at least one action policy; and
provide, via the network interface, the second user interface to the user device.

2. The computing system of claim 1, wherein the instructions are executable to further cause the at least one processor to:
train the machine-learning model using predetermined training data;
wherein the predetermined training data includes one or more of image data, caption data, travel metadata, intent data, or action data.

3. The computing system of claim 1, wherein the at least one action policy comprises at least one of a travel itinerary, a recommendation to book travel, or a recommended location to visit.

4. The computing system of claim 1, wherein the instructions are executable to further cause the at least one processor to:
pull, from a database, historical information of a previously received media input from the user device;
generate a prompt regarding the pulled historical information;
provide, via the network interface, the prompt to the user device;
receive, via the network interface and via an input to the user interface, an indication of a selection of the prompt, the selection of the prompt confirming the historical information displayed on the user interface; and
determine, using the machine-learning model, the at least one action policy based on the at least one identified intent and the confirmed historical information.

5. The computing system of claim 1, wherein the at least one feature of the media input comprises a metadata tag, and wherein the instructions are executable to further cause the at least one processor to:

pull, from a database, a plurality of predetermined tags;

compare, using the machine-learning model, the metadata tag with the plurality of predetermined tags;

determine, using the machine-learning model and based on the comparison, information associated with the metadata tag; and identify, using the machine-learning model, the at least one intent based on the information associated with the metadata tag.

6. The computing system of claim 1, wherein receiving the media input comprises retrieving the media input from a stored collection of media inputs on the user device.

7. The computing system of claim 1, wherein receiving the media input comprises receiving the media input via a camera device of the user device.

8. The computing system of claim 1, wherein receiving the media input comprises receiving the media input via a third-party application programming interface (API).

9. The computing system of claim 1, wherein the machine-learning model comprises at least one pre-processing model and at least one prediction model.

10. A computer-implemented method, comprising:

receiving, by a computing system and from a user device communicably coupled to the computing system, a media input;

extracting, by the computing system using a machine-learning model stored in the computing system, at least one feature of the media input;

receiving, by the computing system, a user preference associated with a user of the user device;

receiving, by the computing system, contextual information associated with the user device;

identifying, by the computing system using the machine-learning model and based at least partly on the user preference and the contextual information, at least one intent associated with the at least one extracted feature of the media input;

determining, by the computing system using the machine-learning model, at least one action policy based on the at least one identified intent;

generating, by the computing system, a user interface comprising the media input, the at least one extracted feature of the media input, and the at least one action policy;

providing, by the computing system, the user interface to the user device;

receiving, by the computing system and via an input to the user interface of the user device, an indication of a selection of the at least one action policy displayed on the user interface;

generating, by the computing system, a second user interface comprising a plurality of options associated with the selected at least one action policy; and providing, by the computing system, the second user interface to the user device.

11. The method of claim 10, further comprising:

training, by the computing system, the machine-learning model using predetermined training data;

wherein the predetermined training data includes one or more of image data, caption data, travel metadata, intent data, or action data.

12. The method of claim 10, wherein the at least one action policy comprises at least one of a travel itinerary, a recommendation to book travel, or a recommended location to visit.

13. The method of claim 10, further comprising:

pulling, by the computing system and from a database, historical information of a previously received media input from the user device;

generating, by the computing system, a prompt regarding the pulled historical information;

providing, by the computing system, the prompt to the user device;

receiving, by the computing system and via an input to the user interface, an indication of a selection of the prompt, the indication of the selection of the prompt confirming the historical information displayed on the user interface; and determining, by the computing system using the machine-learning model, the at least one action policy based on the at least one identified intent and the confirmed historical information.

14. The method of claim 10, wherein the at least one feature of the media input comprises a metadata tag, and wherein the method further comprises:

pulling, by the computing system and from a database, a plurality of predetermined tags;

comparing, by the computing system using the machine-learning model, the metadata tag with the plurality of predetermined tags;

determining, by the computing system using the machine-learning model and based on the comparison, information associated with the metadata tag; and identifying, by the computing system and using the machine-learning model, the at least one intent based on the information associated with the metadata tag.

15. The method of claim 10, wherein receiving the media input comprises retrieving the media input from a stored collection of media inputs on the user device.

16. The method of claim 10, wherein receiving the media input comprises receiving the media input via a camera device of the user device.

17. The method of claim 10, wherein receiving the media input comprises receiving the media input via a third-party application programming interface (API).

18. A non-transitory computer-readable media having computer-executable instructions embodied therein that, when executed by at least one processor of a provider computing system, cause the provider computing system to perform operations comprising:

receiving, from a user device, a media input;

extracting, using a machine-learning model, at least one feature of the media input;

receiving a user preference associated with a user of the user device;

receiving contextual information associated with the user device;

identifying, using the machine-learning model and based at least partly on the user preference and the contextual information, at least one intent associated with the at least one extracted feature of the media input;

determining, using the machine-learning model, at least one action policy based on the at least one identified intent;

generating a user interface comprising the media input, the at least one extracted feature of the media input, and the at least one action policy;

providing the user interface to the user device;

receiving, via an input to the user interface of the user device, an indication of a selection of the at least one action policy displayed on the user interface;

generating a second user interface comprising a plurality of options associated with the selected at least one action policy; and providing the second user interface to the user device.

19. The non-transitory computer-readable media of claim 18, wherein the operations further comprise:

training the machine-learning model using predetermined training data;

wherein the predetermined training data includes one or more of image data, caption data, travel metadata, intent data, or action data.

20. The non-transitory computer-readable media of claim 18, wherein the at least one feature of the media input comprises a metadata tag, and wherein the operations further comprise:

pulling, from a database, a plurality of predetermined tags;

comparing, using the machine-learning model, the metadata tag with the plurality of predetermined tags;

determining, using the machine-learning model, based on the comparison, information associated with the metadata tag; and identifying, using the machine-learning model, the at least one intent based on the information associated with the metadata tag.

* * * * *